US012777494B2

(12) United States Patent
Landis et al.

(10) Patent No.: US 12,777,494 B2
(45) Date of Patent: Oct. 27, 2026

(54) EXTENDED MIB OR SIB FOR REPEATERS IN HIGH BANDS

(71) Applicant: QUALCOMM Incorporated, San Diego, CA (US)

(72) Inventors: Shay Landis, Hod Hasharon (IL); Idan Michael Horn, Hod Hasharon (IL); Yehonatan Dallal, Kfar Saba (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 17/820,226

(22) Filed: Aug. 16, 2022

(65) Prior Publication Data

US 2024/0064627 A1 Feb. 22, 2024

(51) Int. Cl.

| | |
|---|---|
| ***H04W 48/16*** | (2009.01) |
| ***H04W 48/20*** | (2009.01) |
| ***H04W 72/231*** | (2023.01) |
| ***H04W 72/29*** | (2023.01) |
| ***H04W 84/04*** | (2009.01) |
| ***H04W 88/02*** | (2009.01) |
| ***H04W 88/08*** | (2009.01) |
| ***H04W 88/12*** | (2009.01) |
| ***H04W 92/02*** | (2009.01) |
| ***H04W 92/10*** | (2009.01) |
| ***H04W 92/12*** | (2009.01) |

(52) U.S. Cl.

CPC ......... *H04W 72/231* (2023.01); *H04W 48/16* (2013.01); *H04W 48/20* (2013.01); *H04W 72/29* (2023.01); *H04W 84/047* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01)

(58) Field of Classification Search

CPC ... H04B 7/14–17; H04J 11/0069–0093; H04L 5/003–0098; H04W 8/22–245; H04W 48/02–20; H04W 56/001–0025; H04W 72/02–569; H04W 74/002–006; H04W 84/02–16; H04W 88/02–12; H04W 92/02–04; H04W 92/10

See application file for complete search history.

(56) References Cited

U.S. PATENT DOCUMENTS

2018/0092027 A1* 3/2018 Sheng .................. H04W 48/08
2022/0053433 A1* 2/2022 Abedini .............. H04W 56/001

FOREIGN PATENT DOCUMENTS

WO WO-2016111919 A1 * 7/2016 ............ H04W 48/12

OTHER PUBLICATIONS

International Search Report and Written Opinion—PCT/US2023/027935—ISA/EPO—Oct. 24, 2023.

* cited by examiner

*Primary Examiner* — Timothy J Weidner
(74) *Attorney, Agent, or Firm* — Procopio, Cory, Hargreaves & Savitch

(57) ABSTRACT

A method of wireless communication at a UE is disclosed herein. The method includes receiving at least one of a SIB or SSB including a MIB. At least one of the MIB or the SIB is configured for one or more of the UE or a repeater. The method further includes processing at least one of the SIB or the MIB after receiving at least one of the SIB or the MIB.

26 Claims, 14 Drawing Sheets

EXTENDED MIB OR SIB FOR REPEATERS IN HIGH BANDS

TECHNICAL FIELD

The present disclosure relates generally to communication systems, and more particularly, to cell acquisition via a repeater.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus includes a memory and at least one processor coupled to the memory and, based at least in part on information stored in the memory, the at least one processor is configured to: receive at least one of a system information block (SIB) or a synchronization signal block (SSB) including a master information block (MIB), where at least one of the MIB or the SIB is configured for one or more of the UE or a repeater; and process at least one of the SIB or the MIB after receiving at least one of the SIB or the MIB.

In an aspect of the disclosure, a method, a computer-readable medium, and an apparatus are provided for wireless communication at a network node. The apparatus includes a memory and at least one processor coupled to the memory and, based at least in part on information stored in the memory, the at least one processor is configured to: configure at least one of a master information block (MIB) or a system information block (SIB), where the MIB is associated with a synchronization signal block (SSB), where at least one of the MIB or the SIB is configured for one or more of a user equipment (UE) or a repeater; and transmit at least one of the SIB or the SSB including the MIB for one or more of the UE or the repeater.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
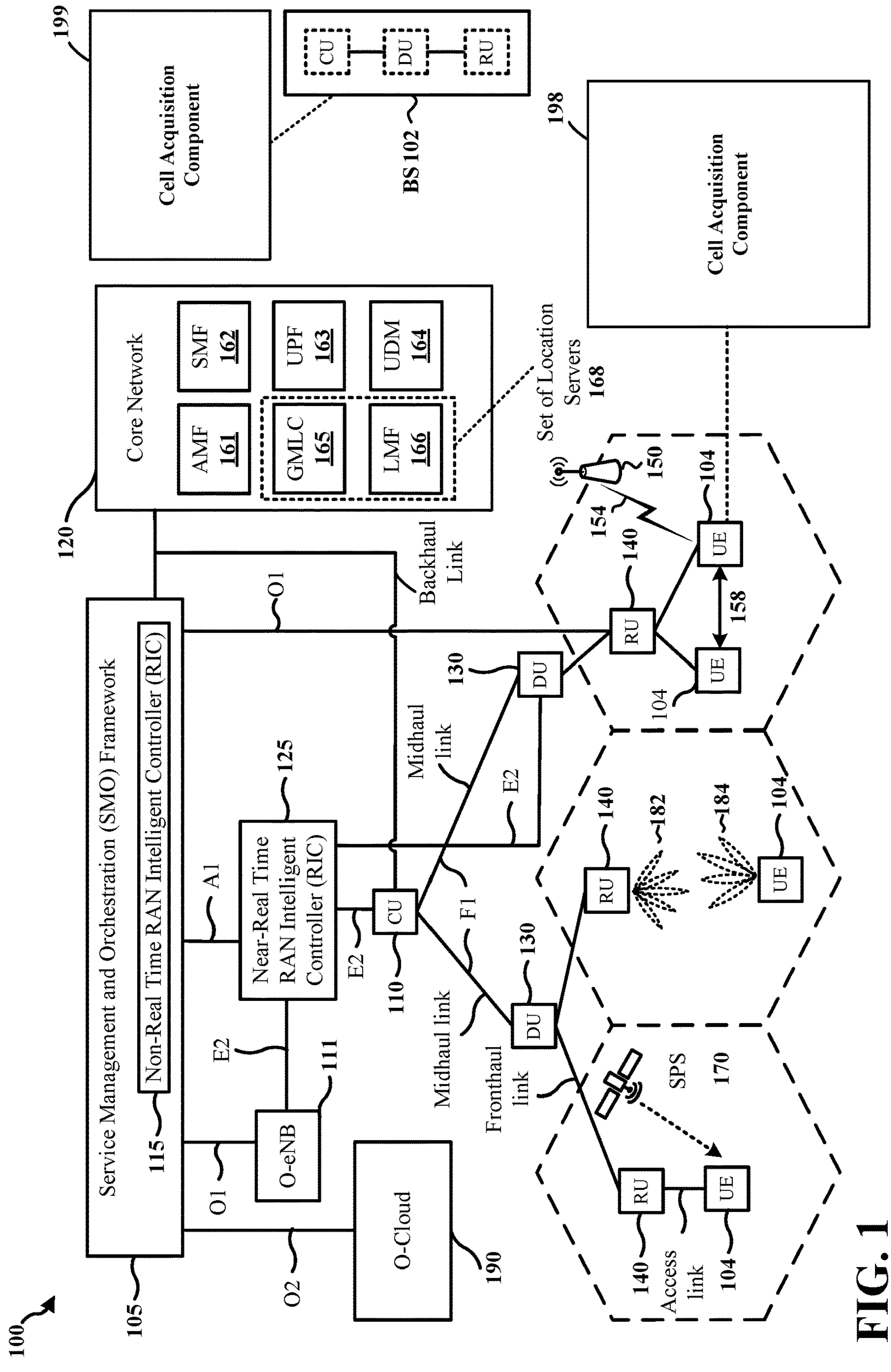
FIG. 1 is a diagram illustrating an example of a wireless communications system and an access network.

A repeater may redirect an SSB transmitted by a base station in several directions to allow a UE to detect the SSB in a different location. The SSB may also include data for cell connection inside a MIB. The MIB may include a time and frequency location of a SIB1. The UE may acquire a cell associated with the base station via the repeater using the MIB and the SIB1. However, transmitting SIBs to UEs in a spatial area covered by a repeater may be associated with high overhead costs. A MIB and/or a SIB configured for the UE and/or the repeater that may be utilized by a UE for cell acquisition via a repeater is disclosed herein. In an example, a UE receives at least one of a SIB or a SSB including a MIB, where at least one of the MIB or the SIB is configured for one or more of the UE or a repeater. The UE processes at least one of the SIB or the MIB after receiving at least one of the SIB or the MIB. Processing at least one of the SIB or the MIB may enable the UE to acquire a cell associated with a network node via the repeater. In one example, the UE may acquire the cell using information from the MIB without receiving a SIB (e.g., a SIB1). In another example, the UE may acquire the cell using information from the MIB and the SIB without receiving additional SIBs. Furthermore, the aforementioned MIB and/or the SIB may reduce an amount of SIBs redirected by the repeater to the UE from a network node. Thus, the aforementioned MIB and/SIB may be associated with reduced signaling overhead for cell acquisition.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface).

Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a cell acquisition component 198 that is configured to receive at least one of a SIB or a SSB including a MIB, where at least one of the MIB or the SIB is configured for one or more of the UE or a repeater; and process at least one of the SIB or the MIB after receiving at least one of the SIB or the MIB. In certain aspects, the base station 102 may include a cell acquisition component 199 that is configured to configure at least one of a MIB or a SIB, where the MIB is associated with a SSB, where at least one of the MIB or the SIB is configured for one or more of a UE or a repeater; and transmit at least one of the SIB or the SSB including the MIB for one or more of the UE or the repeater. Although the following description may be focused on a scenario in which a UE acquires a cell via a repeater, the concepts described herein may be applicable in scenarios in which a UE acquires a cell without using a repeater. Furthermore, although the following description may be focused on 5G NR, the concepts described herein may be applicable to other similar areas, such as LTE, LTE-A, CDMA, GSM, and other wireless technologies.

Figures 2A, 2B, 2C, 2D:
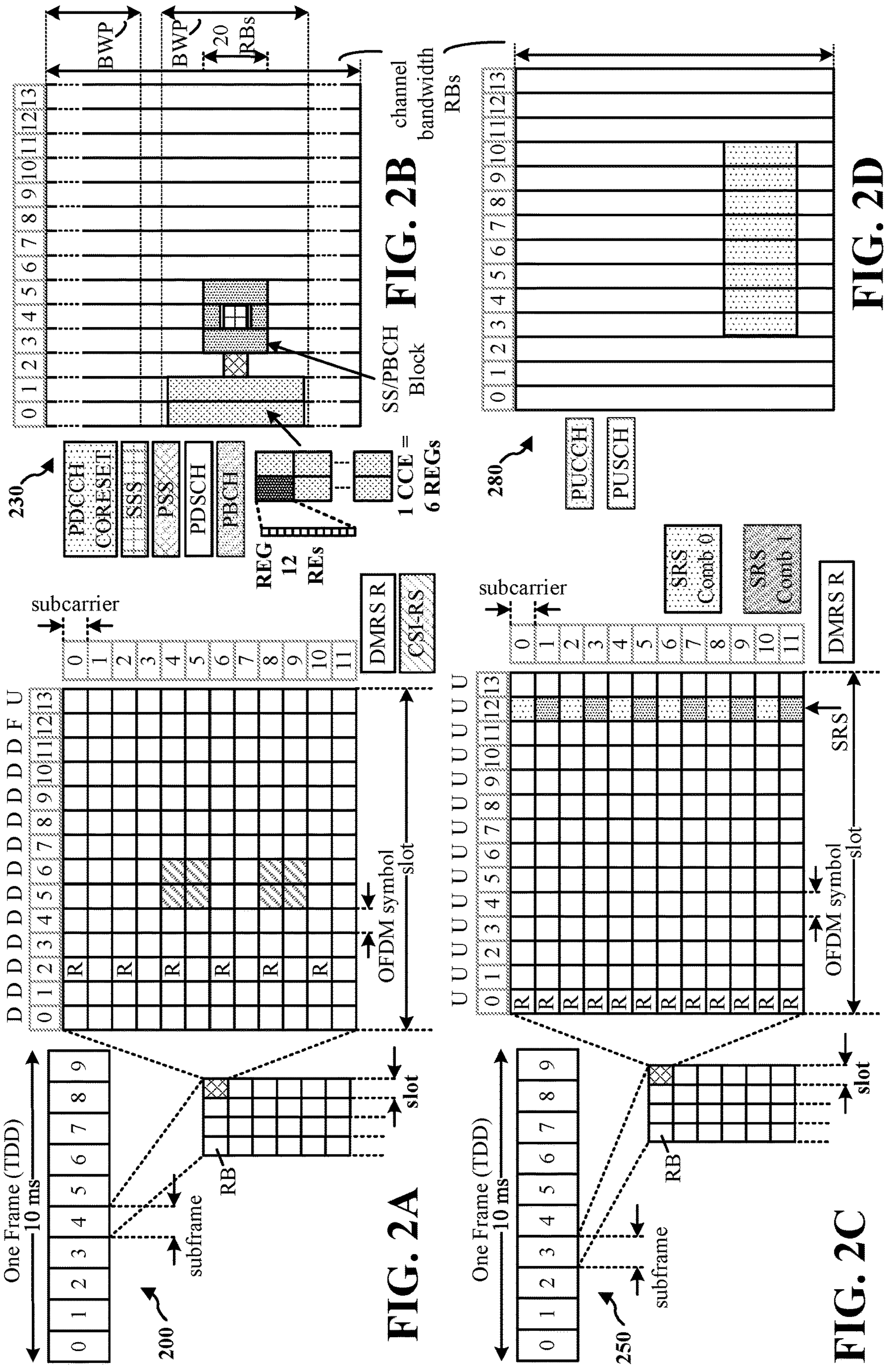
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^{\mu}$ slots/subframe. The subcarrier spacing may be equal to $2^{\mu}*15$ kHz, where $\mu$ is the numerology 0 to 4. As such, the numerology 1.1=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
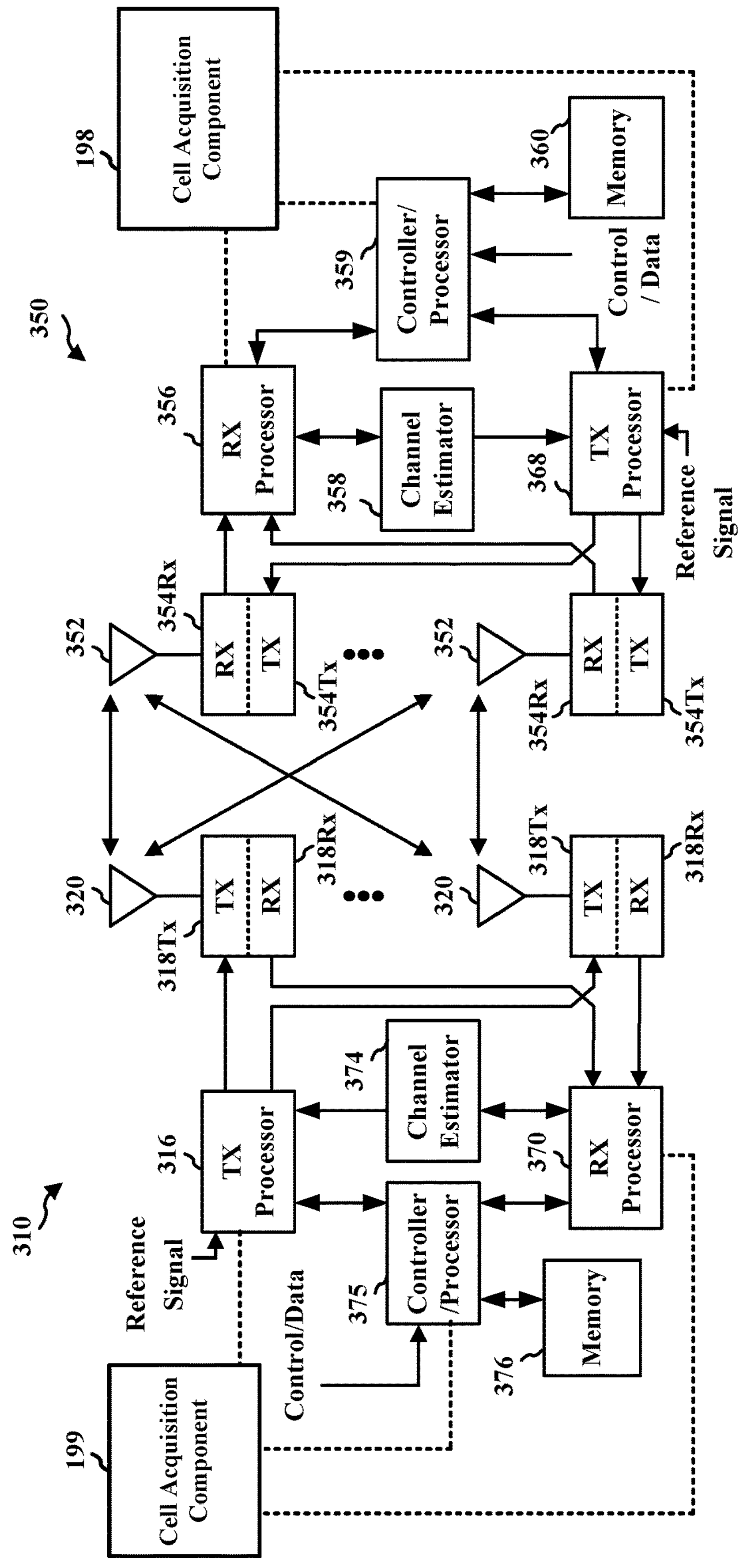
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the cell acquisition component 198 of FIG. 1.

At least one of the TX processor 316, the RX processor 370, and the controller/processor 375 may be configured to perform aspects in connection with the cell acquisition component 199 of FIG. 1.

Figure 4:
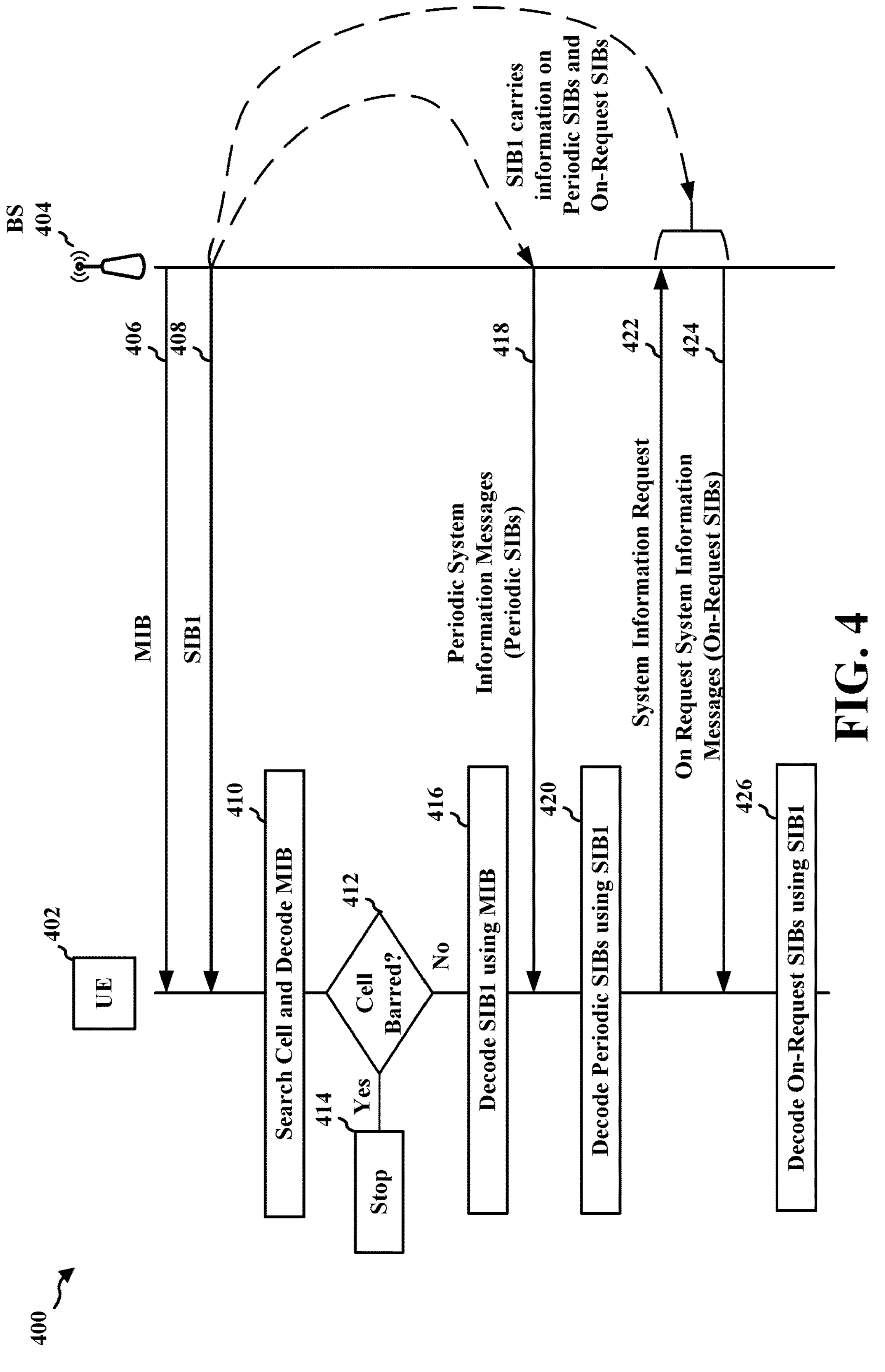
FIG. 4 is a diagram illustrating example of communications between a base station and a UE for cell acquisition.

FIG. 4 is a diagram 400 that illustrates example steps of cell acquisition. At 406, a base station 404 may transmit a MIB. The MIB may contain information for the UE to acquire remaining system information broadcast by a network. The MIB may be included in an SSB. A combination of the PSS, the SSS, and the PBCH may refer to the SSB. At 408, the base station may transmit a type 1 system information block (SIB1). A SIB may carry different types of system information. At 410, a UE 402 may search a cell (associated with the base station 404) to acquire and decode the MIB. At 412, the UE 402 may determine whether the MIB includes a cell barred indication. If the MIB includes a cell barred indication, at 414, the UE 402 may cease cell acquisition. If the MIB does not include a cell barred indication, at 416, the UE 402 may decode the SIB1 using parameters included in the MIB.

The UE 402 may utilize parameters in the SIB1 to decode other SIBs. The other SIBs may include a type 2 SIB (SIB2), a type 3 SIB (SIB3), a type 4 SIB (SIB4), a type 5 SIB (SIB5), a type 6 SIB (SIB6), a type 7 SIB (SIB7), a type 8 SIB (SIB8), and/or a type 9 SIB (SIB9). In an example, at 418, the base station may transmit periodic system information messages (periodic SIBs). At 420, the UE 402 may decode the periodic SIBs using the parameters in the SIB1. In another example, at 422, the UE 402 may transmit a system information request to the base station 404. At 424, upon receiving the system information request, the base station 404 may transmit on request system information messages (on-request SIBs) to the UE 402. At 426, the UE 402 may decode the on-request SIBs using the SIB1.

SIBs (e.g., SIB1 and other SIBs) may include a plethora of information. Some of the information may not be relevant in situations in which a UE accesses a cell via a repeater (described in greater detail below). For example, SIBs may include information such as cell selection information, a random access channel (RACH) configuration, cell reselection common information, a NR intra-frequency neighbor cell list and reselection criteria, an evolved universal terrestrial radio access (E-UTRA) neighbor cell list and reselection criteria, earthquake and tsunami warning system (ETWS) information, global positioning satellite (GPS) time, or coordinated universal time (UTC), some or all of which may not be relevant for cell acquisition via a repeater.

Figure 5:
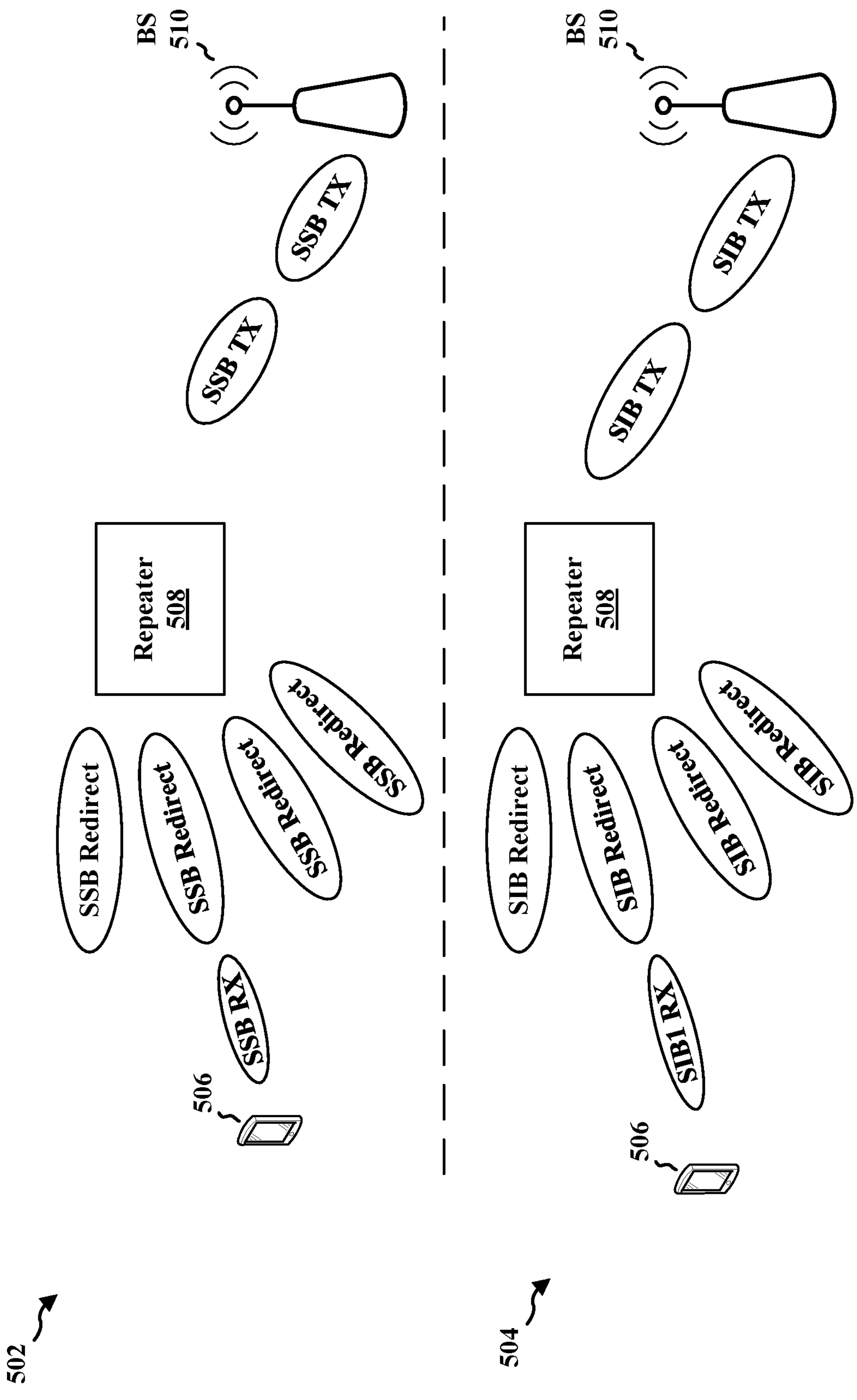
FIG. 5 includes diagrams illustrating example cell acquisition via a repeater.

FIG. 5 includes a first diagram 502 and a second diagram 504 that depict an example of cell acquisition by a UE 506 via a repeater 508. In the first diagram 502, a base station 510 may transmit an SSB towards the repeater 508. The SSB may include a MIB. The SSB may be one of sixty-four SSBs transmitted by the base station 510. The base station 510 may transmit multiple repetitions of the SSB towards the repeater 508. The repeater 508 may redirect the transmitted SSB in different directions at different points in time via different beams. The UE 506 may receive the SSB from one of the (redirected) different beams.

In the second diagram 504, the base station 510 may transmit a SIB1 towards the repeater 508. The base station 510 may transmit multiple repetitions of the SIB1 towards the repeater 508. The SIB1 may include information that is utilized to access a cell associated with the base station 510. The repeater 508 may redirect the transmitted SIB1 in different directions at different points in time via different beams. The UE 506 may receive the SIB1 from one of the redirected beams. The UE 506 may decode the SIB1 using information from the MIB in order to access a cell associated with the base station 510. The base station 510 may transmit other SIBs in a manner similar to SIB1. Similarly, the repeater 508 may redirect the other SIBs in a manner similar to SIB1. Redirecting the other SIBs may consume a relatively high amount of overhead.

A line of sight (LOS) channel may be important for achieving coverage and high throughputs for wireless communication systems operating in certain frequency ranges. For instance, a LOS channel may be important for wireless communication systems operating in FR1 (410 MHz to 7.125 GHz), FR2 (24.25 GHz to 52.6 GHz), or frequency range 5 (FR5) (95 GHz to 325 GHz). When a UE is located indoors or in an urban area, a LOS channel may be difficult to establish. Some deployments may rely upon one or more of repeaters, relays, femto-cells, and/or reconfigurable intelligence surfaces (RISs) (collectively referred to herein as "repeaters" for ease of explanation) to penetrate or bypass obstacles that impede the LOS channel, such as window or a person.

A repeater may receive a wireless signal from a base station and amplify and/or redirect the wireless signal. In an example, the repeater may transmit different beams in different directions at different points in time based upon the wireless signal. A UE may receive the wireless signal via one of the (redirected) different beams. A relay may receive a wireless signal from a base station, apply FEC to the received wireless signal, and subsequently redirect the received wireless signal to a UE. A femto-cell may be a small, low-power base station that is designed for use in a home or small building. A femtocell allows service coverage to be extended indoors or at a cell edge. A RIS may be an artificial planar structure with integrated electronic circuits that can be programmed to manipulate a wireless signal.

As noted above, a repeater may receive a wireless signal from a base station and amplify and/or redirect the wireless signal, where the amplified/redirected wireless signal may then be received by a UE. A repeater may operate according to several principles. First, the repeater may operate with relatively low latency such that UE channel delay spread does pass a CP length in order to reduce intersymbol interference (ISI). Second, the repeater may be configured to provide coverage to a spatial area, such as a room. Third, the repeater may support communication for multiple UEs within the spatial area.

In some situations, a repeater operating in a frequency band (e.g., FR1, FR2, FR5, etc.) may redirect an SSB transmitted by a base station in several directions to allow a UE to detect the SSB in a different location. The SSB may incorporate basic signaling (e.g., a PSS and a SSS) for acquisition of a cell associated with the base station. The SSB may also include data for cell connection inside a MIB carried by a PBCH. The MIB may carry information regarding where to find information utilized for cell access, cell selection management, and/or additional auxiliary information. The MIB may indicate a time and frequency location of a SIB1 and time and frequency locations of other SIBs (secondary SIBs). Transmitting SIBs to UEs in a spatial area covered by a repeater may be associated with high overhead costs. Thus, it may be beneficial to provide a MIB or a SIB that incurs less overhead with respect to cell acquisition via a repeater.

To address the aforementioned issues, an extended MIB and/or an extended SIB that may be utilized by a UE for cell acquisition via a repeater is disclosed herein. The extended MIB and/or the extended SIB may enable the UE to acquire a cell via a repeater using less signaling compared to acquiring a cell using another MIB or another SIB. In an example, a UE receives at least one of a SIB or a SSB including a MIB, where at least one of the MIB or the SIB is configured for one or more of the UE or a repeater. The UE processes at least one of the SIB or the MIB after receiving at least one of the SIB or the MIB. Processing at least one of the SIB or the MIB may enable the UE to acquire a cell associated with a network node via the repeater. In one example, the UE may acquire the cell using information from the MIB without receiving a SIB (e.g., a SIB1). In another example, the UE may acquire the cell using information from the MIB and the SIB without receiving additional SIBs. Furthermore, the aforementioned MIB and/or the SIB may reduce an amount of SIBs redirected by the repeater to the UE from a network node.

Figure 6:
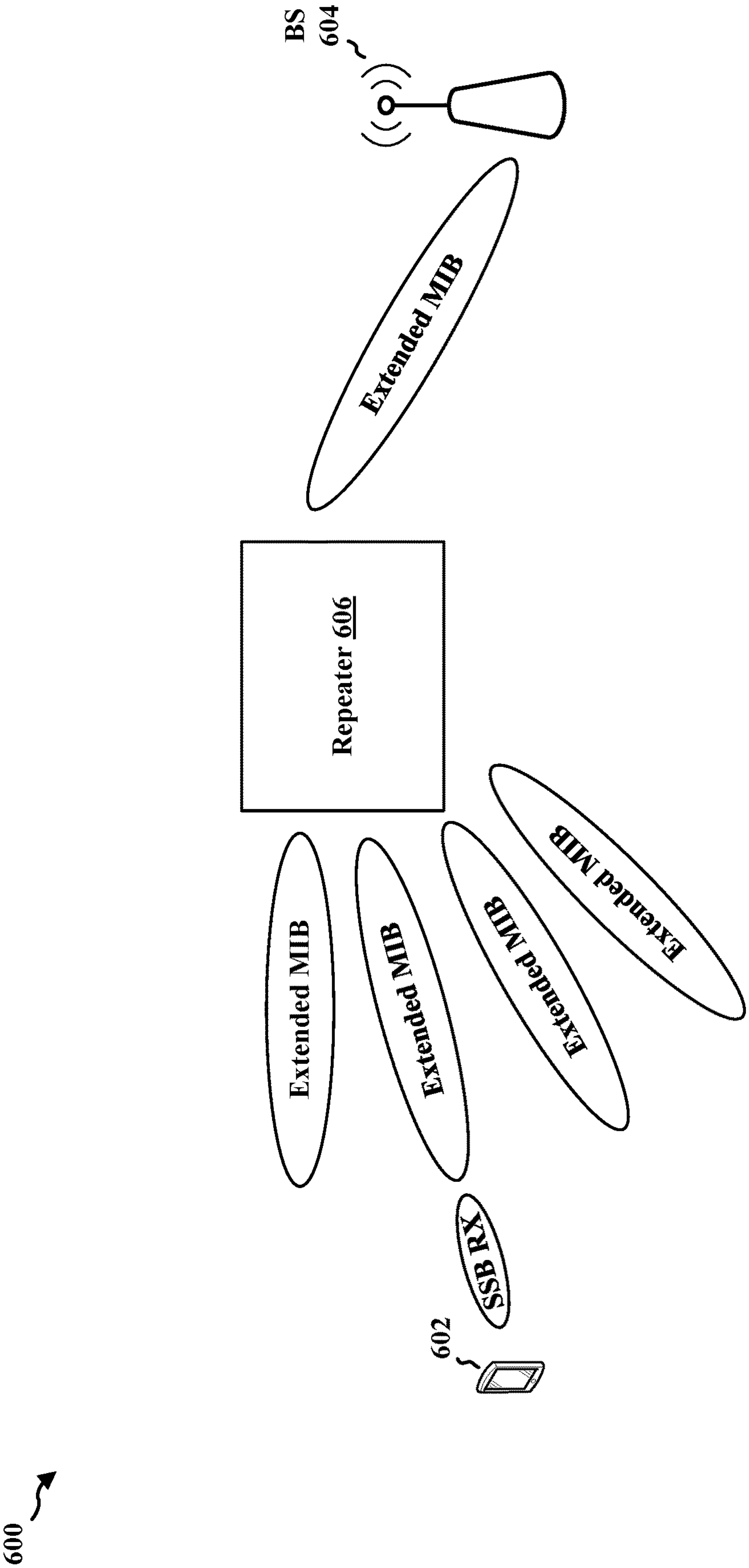
FIG. 6 is a diagram illustrating example cell acquisition via a repeater using an extended master information block (MIB).

FIG. 6 is a diagram 600 that depicts an example of cell acquisition by a UE 602 using a repeater 606. A base station 604 may configure and transmit an extended MIB towards the repeater 606. The base station 604 may transmit multiple repetitions of the extended MIB towards the repeater 606.

Figure 8:
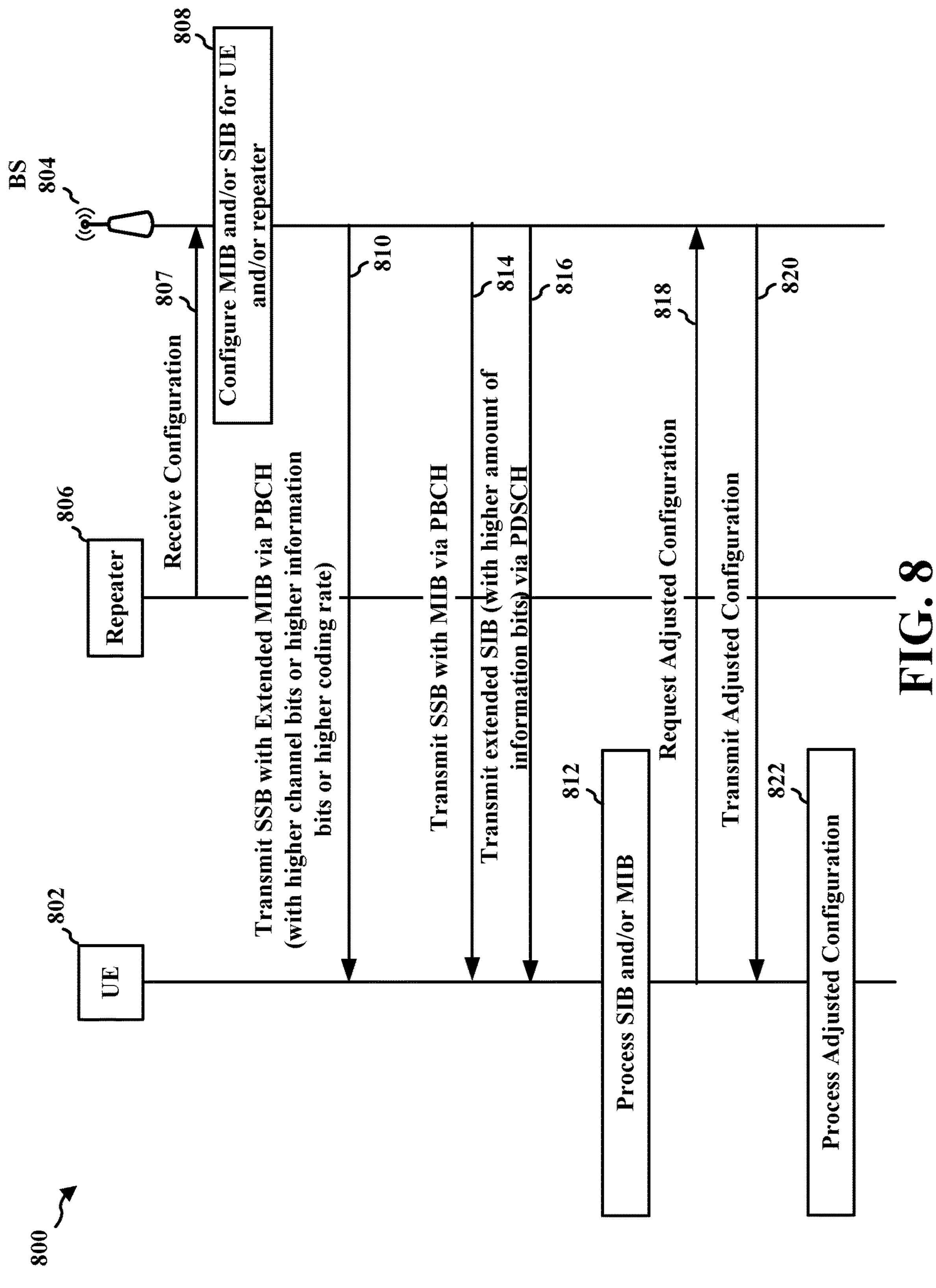
FIG. 8 is a diagram illustrating example communications between a base station and a UE via a repeater.

FIG. 8 is a diagram 800 illustrating example communications between a base station 804 and a UE 802 via a repeater 806. For example, referring to FIG. 8, at 808, the base station 804 may configure a MIB for the UE 802 and/or the repeater 806. The MIB may be an extended MIB. In some aspects, at 807, the base station 804 may receive a configuration from the repeater 806 and the base station 804 may configure the MIB for the UE 802 and/or the repeater 806 based on the configuration. At 810, the base station 804 may transmit an SSB that includes the extended MIB via a PBCH. The PBCH may include a higher amount of channel bits or a higher amount of information bits compared to another PBCH. In an example, if the PBCH includes the higher amount of information bits, the PBCH may include a higher coding rate compared to another PBCH. The repeater 606 may not consider coverage conditions of −6 dB signal to noise ratio (SNR).

The extended MIB may include additional information bits carried in a PBCH as part of an SSB. The extended MIB may be a repeater-specific MIB. The additional information bits may include information that allows the UE 602 to access the repeater 606. In an example, the extended MIB may include one or more of cell selection information, common cell reselection information, barring information, or UE timer and constant information. In another example, the extended MIB may further include one or more of a system frame number, a subcarrier spacing, an SSB subcarrier offset, a DM-RS type A position, a PDCCH configuration for a SIB1, a cell barred status, or an intra-frequency reselection status.

The repeater 606 may redirect the extended MIB via different beams at different points in time. The UE 602 may receive the extended MIB (included in the SSB) via one of the different beams. The UE 602 may process (e.g., decode) the extended MIB. For example, referring to FIG. 8, at 812, the UE 802 may the MIB (which may be an extended MIB) transmitted by the base station 804 at 810. As the extended MIB may include additional bits that may allow the UE 602 to access the repeater 606 (and hence a cell associated with the base station 604), the UE 602 may access the cell without acquiring SIBs (e.g., SIB1) from the repeater 606.

Figure 7:
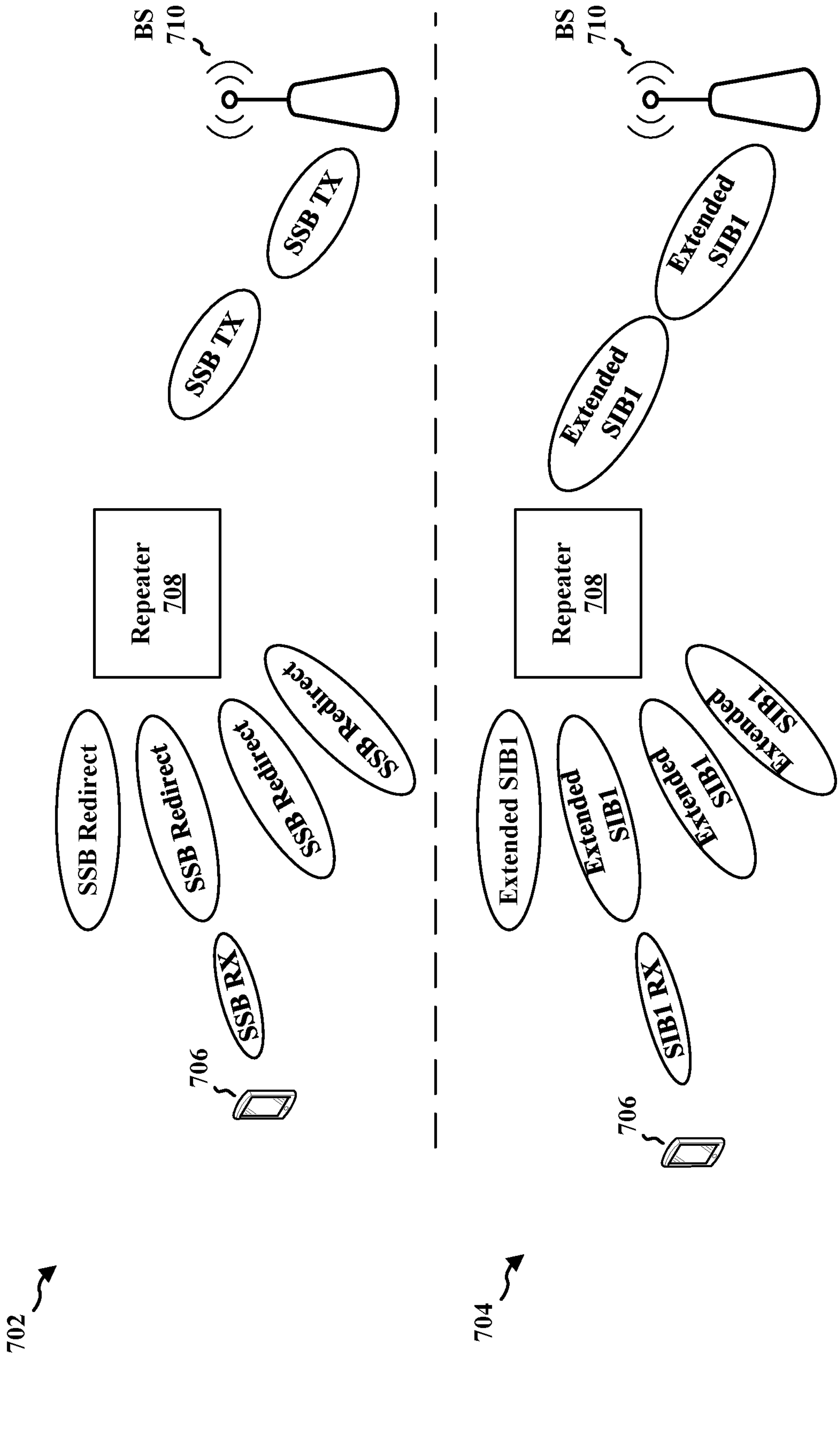
FIG. 7 includes diagrams illustrating example cell acquisition via a repeater using an extended type 1 system information block (SIB1).

FIG. 7 includes a first diagram 702 and a second diagram 704 that depict an example of cell acquisition by a UE 706 using a repeater 708. In the first diagram 702, a base station 710 may transmit a SSB towards the repeater 708. The SSB may include a MIB. The MIB may be similar or identical to the MIB referenced in FIG. 5 or the MIB may have modified information bits. The base station 710 may transmit multiple repetitions of the SSB towards the repeater 708. The repeater 708 may redirect the transmitted SSB in different directions at different points in time via different beams. The UE 706 may receive the SSB from one of the redirected beams.

For example, referring to FIG. 8, at 814, the base station 804 may transmit an SSB including a MIB via a PBCH towards the repeater 806. The repeater 806 may redirect the MIB via different beams directed in different directions at different points in time. The UE 802 may receive the MIB (included in the SSB) via one of the different beams. At 812, the UE 802 may process (e.g., decode) the MIB.

In the second diagram 704, the base station 710 may transmit an extended SIB1 towards the repeater 708 after transmitting the SSB. The extended SIB1 may include information that the UE 706 may utilize to access the repeater 708 (and hence a cell associated with the base station 710).

For example, referring to FIG. 8, at 808, the base station 804 may configure a SIB for the UE 802 and/or the repeater 806, and the SIB may be an extended SIB (and/or a repeater SIB that is tailored for the repeater 806). In some aspects, at 807, the base station 804 may receive a configuration from the repeater 806 and the base station 804 may configure the SIB for the UE 802 and/or the repeater 806 based on the configuration. The extended SIB may be an extended SIB1 or the repeater SIB may be a repeater SIB1. In some aspects, the extended SIB may not include information found in another SIB due to the information not being relevant in scenarios in which the UE 802 acquires a cell via a repeater. For instance, the information may include cell selection information, a RACH configuration, cell reselection common information, a NR intra-frequency neighbor cell list and reselection criteria, an E-UTRA neighbor cell list and reselection criteria, ETWS information, GPS time, or coordinated UTC. As such, the extended SIB may require less overhead to transmit than another SIB. At 816, subsequent to transmitting the SSB, the base station 804 may transmit the extended SIB via a PDSCH. At 812, the UE 802 may process the MIB and the extended SIB. For instance, the UE 802 may decode the MIB. Using the decoded MIB, the UE 802 may then decode the extended SIB. The UE 802 may access the cell associated with the base station 804 using the extended SIB. In one aspect, the UE 802 may not acquire additional SIBs from the base station 804 after processing the extended SIB, as the additional SIBs may not include information for accessing the repeater 806.

In one aspect, at 818, the UE 802 may transmit a request for an adjusted configuration towards the repeater 806. The repeater 806 may direct the request to the base station 804. At 820, the base station may transmit an adjusted configuration towards the repeater 806. The repeater 806 may redirect the adjusted configuration to the UE 802 via different beams transmitted in different directions at different times. At 822, the UE 802 may process the adjusted configuration.

Figure 9:
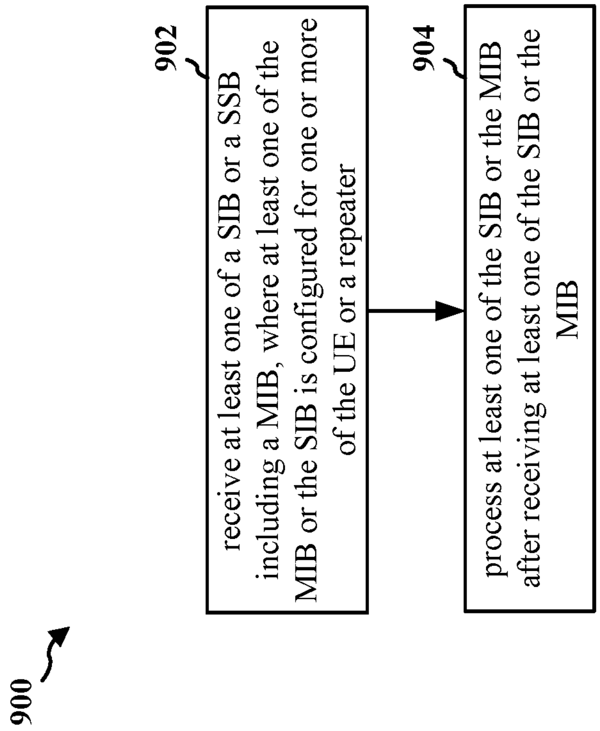
FIG. 9 is a flowchart of a method of wireless communication.

FIG. 9 is a flowchart 900 of a method of wireless communication. The method may be performed by a UE (e.g., the UE 104, the UE 602, the UE 706, the UE 802, the apparatus 1304). In an example, the method may be performed by the cell acquisition component 198. The method may be associated with various technical advantages, such as reduced signaling overhead.

At 902, the UE receives at least one of a SIB or a SSB including a MIB, where at least one of the MIB or the SIB is configured for one or more of the UE or a repeater. In an example, referring to FIG. 8, the UE 802 may receive a SSB including a MIB transmitted by the base station 804 at 810, where the MIB may be configured for the UE 802 and/or the repeater 806. In another example, referring to FIG. 8, the UE 802 may receive a SSB with a MIB transmitted by the base station 804 at 814. In yet another example, referring to FIG. 8, the UE 802 may receive a SIB transmitted by the base station 804 at 816, where the SIB may be configured for the UE 802 and/or the repeater 806. For example, 902 may be performed by the cell acquisition component 198.

At 904, the UE processes at least one of the SIB or the MIB after receiving at least one of the SIB or the MIB. For example, referring to FIG. 8, at 812, the UE 802 may process the SIB and/or the MIB transmitted by the base station 804 at 810 or at 814 and 816. For example, 904 may be performed by the cell acquisition component 198.

Figure 10:
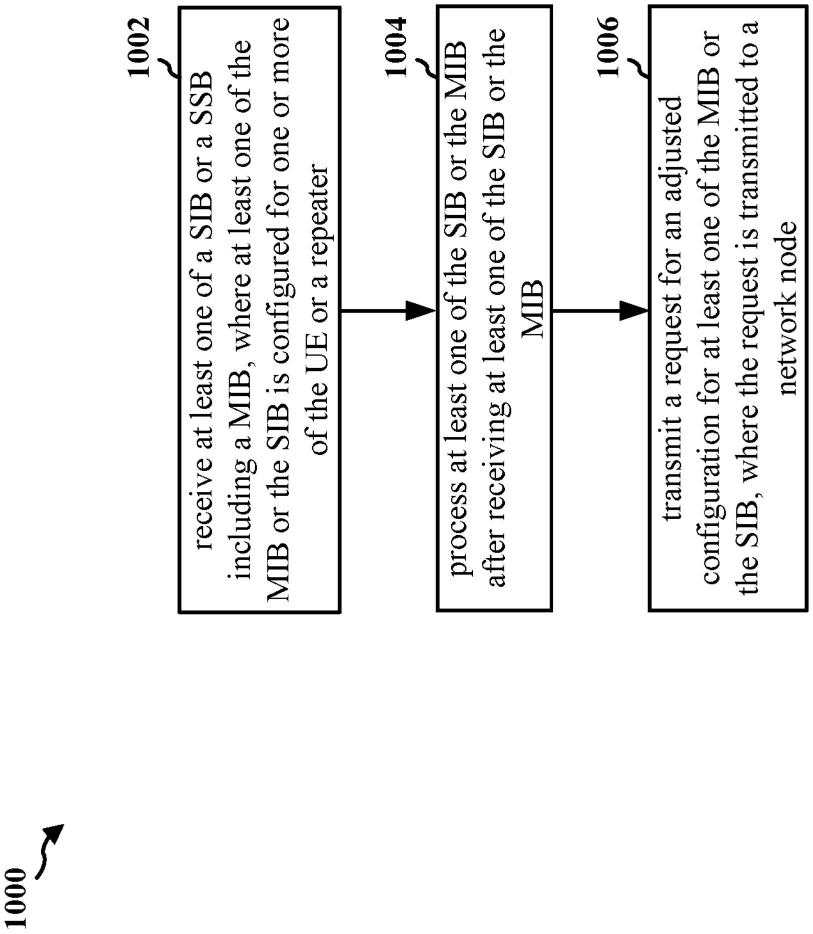
FIG. 10 is a flowchart of a method of wireless communication.

FIG. 10 is a flowchart 1000 of a method of wireless communication. The method may be performed by a UE (e.g., the UE 104, the UE 602, the UE 706, the UE 802, the apparatus 1304). In an example, the method (including the various aspects described below) may be performed by the cell acquisition component 198. The method may be associated with various technical advantages, such as reduced signaling overhead.

At 1002, the UE receives at least one of a SIB or a SSB including a MIB, where at least one of the MIB or the SIB is configured for one or more of the UE or a repeater. In an example, referring to FIG. 8, the UE 802 may receive a SSB including a MIB transmitted by the base station 804 at 810, where the MIB may be configured for the UE 802 and/or the repeater 806. In another example, referring to FIG. 8, the UE 802 may receive a SSB with a MIB transmitted by the base station 804 at 814. In yet another example, referring to FIG. 8, the UE 802 may receive a SIB transmitted by the base station 804 at 816, where the SIB may be configured for the UE 802 and/or the repeater 806. For example, 1002 may be performed by the cell acquisition component 198.

At 1004, the UE processes at least one of the SIB or the MIB after receiving at least one of the SIB or the MIB. For example, referring to FIG. 8, at 812, the UE 802 may process the SIB and/or the MIB transmitted by the base station 804 at 810 or at 814 and 816. Processing the SIB and/or the MIB may include acquiring a cell associated with the base station 804. For example, 1004 may be performed by the cell acquisition component 198.

In one aspect, the MIB may be an extended MIB including an extended amount of first information bits or the SIB may be an extended SIB including an extended amount of second information bits. For example, FIGS. 6 and 7 respectively illustrate extended MIBs and extended SIBs. In another example, referring to FIG. 8, the UE 802 may receive a SSB with an extended MIB transmitted by the base station 804 at 810. In yet another example, the UE 802 may receive an extended SIB transmitted by the base station 804 at 816. The first amount of extended information bits in the extended MIB may enable the UE 802 to acquire a cell associated with the base station 804 via the repeater 806 without receiving a SIB. The second amount of extended information bits in the extended SIB may enable the UE 802 to acquire the cell associated with the base station 804 via the repeater 806 without receiving additional SIBs.

In one aspect, the extended MIB may include a higher amount of the first information bits compared to at least one other MIB or the extended SIB may include a higher amount of the second information bits compared to at least one other SIB. For example, the extended MIB illustrated in FIG. 6 may include a higher amount of information bit compared to a MIB in the SSB illustrated in FIG. 5. In another example, the extended SIB illustrated in FIG. 7 may include a higher amount of information bits compared to the SIB illustrated in FIG. 5.

In one aspect, the MIB may be a repeater-specific MIB and the SIB may be a repeater-specific SIB. For example, referring to FIG. 8, the MIB transmitted at 810 may be specific to the repeater 806. In further example, the extended MIB illustrated in FIG. 6 may be specific to the repeater 606. In another example, referring to FIG. 8, the SIB transmitted at 816 may be specific to the repeater 806. In yet another example, the extended SIB1 illustrated in FIG. 7 may be specific to the repeater 708.

In one aspect, the repeater-specific SIB may fail to include information in at least one other SIB. For example, the extended SIB1 illustrated in FIG. 7 may omit certain information that is included in the SIB1 illustrated in FIG. 5. Omission of the certain information may reduce signaling overhead.

In one aspect, the information in the at least one other SIB may include one or more of: cell selection information, a RACH configuration, common cell reselection information, a NR intra-frequency neighbor cell list and reselection criteria, E-UTRA neighbor cell list and reselection criteria, ETWS information, a GPS time, or a UTC. For example, the SIB1 illustrated in FIG. 5 may include cell selection information, a RACH configuration, common cell reselection information, a NR intra-frequency neighbor cell list and reselection criteria, E-UTRA neighbor cell list and reselection criteria, ETWS information, a GPS time, and/or a UTC.

In one aspect, the UE may operate in FR5. For example, the UE 602 in FIG. 6, the UE 706 in FIG. 7, and/or the UE 802 in FIG. 8 may operate in FR5.

In one aspect, the SIB may be a SIB1. For example, referring to FIG. 8, the extended SIB transmitted by the base station 804 at 816 may be a SIB1. In another example, FIG. 7 illustrates an extended SIB1.

In one aspect, at least one of the SIB or the SSB including the MIB may be received via the repeater. For example, referring to FIG. 6, the UE 602 may receive an extended MIB via the repeater 606. In another example, referring to FIG. 8, the UE 802 may receive the extended MIB transmitted by the base station 804 at 810 via the repeater 806. In a further example, referring to FIG. 7, the UE 602 may receive an SSB including a MIB and an extended SIB1 via the repeater 708. In another example, referring to FIG. 8, the UE 802 may receive an extended SIB transmitted by the base station 804 at 816 via the repeater 806.

In one aspect, the MIB may include at least one of: cell selection information, common cell reselection information, barring information, or UE timer and constant information. For example, referring to FIG. 6, the extended MIB may include cell selection information, common cell reselection information, barring information, and/or UE timer and constant information. In another example, referring to FIG. 8, the extended MIB transmitted by the base station 804 at 810 may include cell selection information, common cell reselection information, barring information, and/or UE timer and constant information.

In one aspect, the MIB may further include at least one of: a system frame number, a subcarrier spacing, an SSB subcarrier offset, a DM-RS type A position, a PDCCH configuration for a SIB1, a cell barred status, or an intra-frequency reselection status. For example, referring to FIG. 6, the extended MIB may include a system frame number, a subcarrier spacing, an SSB subcarrier offset, a DM-RS type A position, a PDCCH configuration for a SIB1, a cell barred status, and/or an intra-frequency reselection status. In another example, referring to FIG. 8, the extended MIB transmitted by the base station 804 at 810 may include a system frame number, a subcarrier spacing, an SSB subcarrier offset, a DM-RS type A position, a PDCCH configuration for a SIB1, a cell barred status, and/or an intra-frequency reselection status.

In one aspect, the MIB may be received via a PBCH. For example, referring to FIG. 8, the UE 802 may receive the SSB with the extended MIB transmitted by the base station 804 at 810 via a PBCH.

In one aspect, the PBCH may include at least one of a higher amount of channel bits or a higher amount of information bits compared to at least one other PBCH. For example, referring to FIG. 8, the PBCH at 810 may include a higher amount of channel bits or a higher amount of information bits compared to the PBCH at 814.

In one aspect, if the PBCH includes the higher amount of the information bits, the PBCH may include a higher coding rate compared to the at least one other PBCH. For example, referring to FIG. 8, the PBCH at 810 may include a higher amount of information bits than information bits of the PBCH at 814 and the PBCH at 810 may include a higher coding rate compared to a coding rate of the PBCH at 814.

In one aspect, the SIB may be received after the SSB including the MIB. For example, FIG. 7 illustrates that the UE 706 may receive the extended SIB1 after the UE 706 receives the SSB with a MIB. In another example, referring to FIG. 8, the UE 802 may receive a SSB with a MIB transmitted by the base station 804 at 814 and the UE 802 may receive the extended SIB transmitted by the base station 804 at 816, where 814 may occur before 816.

In one aspect, the SIB may be received via a PDSCH. For example, referring to FIG. 8, the UE 802 may receive the extended SIB transmitted by the base station 804 at 816 via a PDSCH.

In one aspect, at 1006, the UE may transmit a request for an adjusted configuration for at least one of the MIB or the SIB, where the request is transmitted to a network node. For example, referring to FIG. 8, at 818, the UE 802 may request an adjusted configuration from the base station 804. For example, 1006 may be performed by the cell acquisition component 198.

Figure 11:
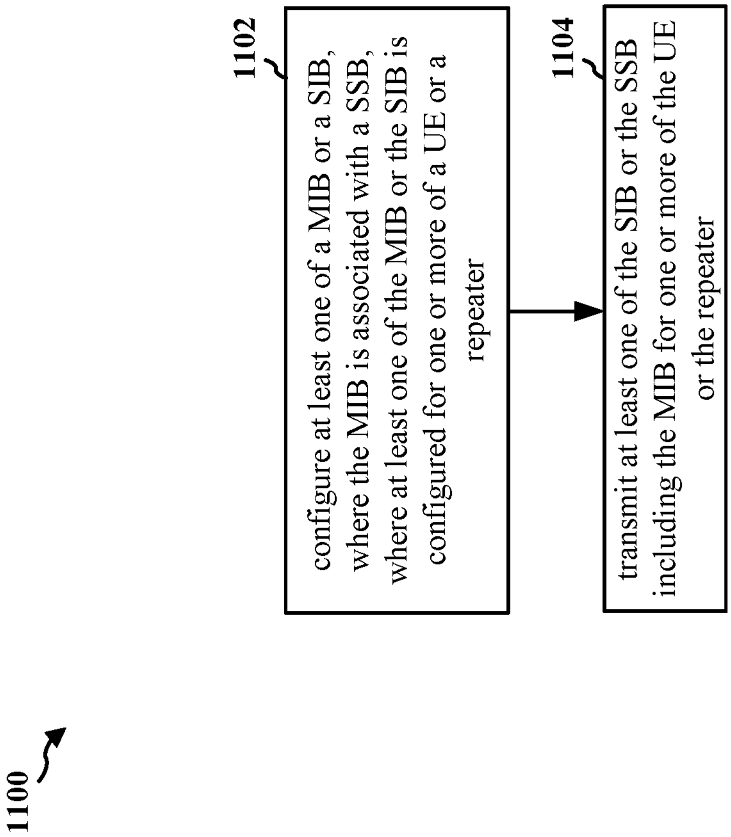
FIG. 11 is a flowchart of a method of wireless communication.

FIG. 11 is a flowchart 1100 of a method of wireless communication. The method may be performed by a network node (e.g., the base station 102, the base station 604, the base station 710, the base station 804, the network entity 1302). In an example, the method may be performed by the cell acquisition component 199. The method may be associated with various technical advantages, such as reduced signaling overhead.

At 1102, the network node configures at least one of a MIB or a SIB, where the MIB is associated with a SSB, where at least one of the MIB or the SIB is configured for one or more of a UE or a repeater. In an example, referring to FIG. 8 at 808, the base station 804 may configure a MIB associated with an SSB and/or a SIB for the UE 802 and/or the repeater 806. For example, 1102 may be performed by the cell acquisition component 199.

At 1104, the network node transmits at least one of the SIB or the SSB including the MIB for one or more of the UE or the repeater. In an example, referring to FIG. 8 at 810, the base station 804 may transmit a SSB including a MIB, where the MIB may be configured for the UE 802 and/or the repeater 806. In a further example, FIG. 6 illustrates that the repeater 806 may redirect an extended MIB to the UE 602. In another example, referring to FIG. 8 at 814, the base station 804 may transmit a SSB with a MIB. In yet another example, referring to FIG. 8 at 816, the base station 804 may transmit a SIB, where the SIB may be configured for the UE 802 and/or the repeater 806. In a further example, FIG. 7 illustrates that the repeater 708 may redirect an SSB including a MIB and an extended SIB1 towards the UE 706. For example, 1104 may be performed by the cell acquisition component 199.

Figure 12:
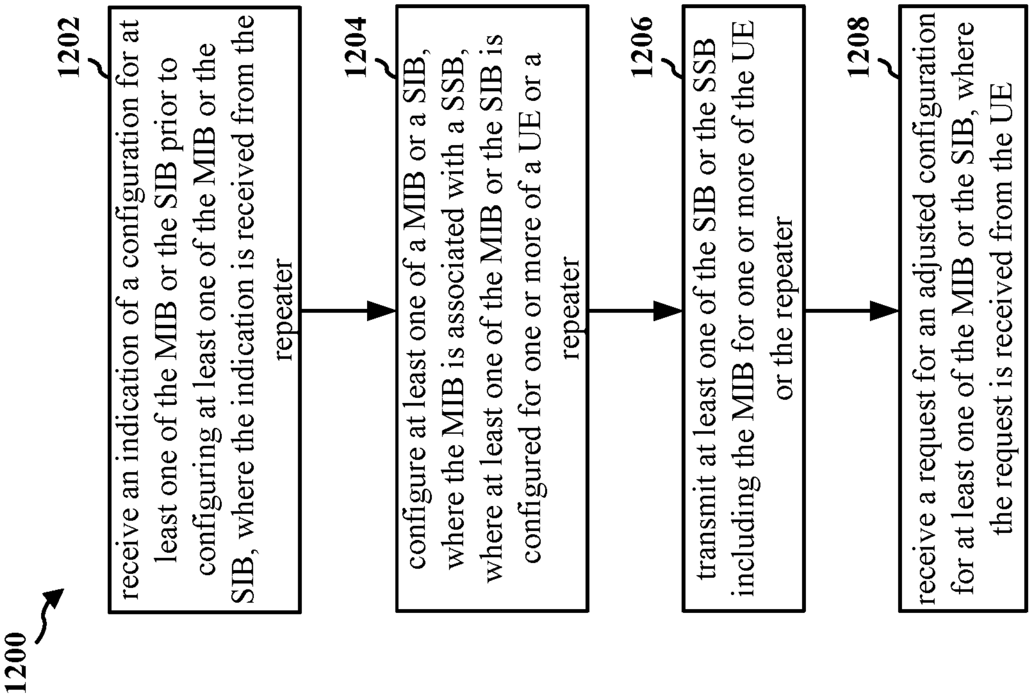
FIG. 12 is a flowchart of a method of wireless communication.

FIG. 12 is a flowchart 1200 of a method of wireless communication. The method may be performed by a network node (e.g., the base station 102, the base station 604, the base station 710, the base station 804, the network entity 1302). In an example, the method (including the various aspects described below) may be performed by the cell acquisition component 199. The method may be associated with various technical advantages, such as reduced signaling overhead.

At 1204, the network node configures at least one of a MIB or a SIB, where the MIB is associated with a SSB, where at least one of the MIB or the SIB is configured for one or more of a UE or a repeater. In an example, referring to FIG. 8 at 808, the base station 804 may configure a MIB associated with an SSB and/or a SIB for the UE 802 and/or the repeater 806. For example, 1204 may be performed by the cell acquisition component 199.

At 1206, the network node transmits at least one of the SIB or the SSB including the MIB for one or more of the UE or the repeater. In an example, referring to FIG. 8 at 810, the base station 804 may transmit a SSB including a MIB, where the MIB may be configured for the UE 802 and/or the repeater 806. In a further example, FIG. 6 illustrates that the repeater 806 may redirect an extended MIB to the UE 602. In another example, referring to FIG. 8 at 814, the base station 804 may transmit a SSB with a MIB. In yet another example, referring to FIG. 8 at 816, the base station 804 may transmit a SIB, where the SIB may be configured for the UE 802 and/or the repeater 806. In a further example, FIG. 7 illustrates that the repeater 708 may redirect an SSB including a MIB and an extended SIB1 towards the UE 706. For example, 1206 may be performed by the cell acquisition component 199.

In one aspect, the MIB may be an extended MIB including an extended amount of first information bits or the SIB may be an extended SIB including an extended amount of second information bits. For example, FIGS. 6 and 7 respectively illustrate extended MIBs and extended SIBs. In another example, referring to FIG. 8 at 810, the base station 804 may transmit a SSB with an extended MIB. In yet another example at 816, the base station 804 may transmit an extended SIB. The first amount of extended information bits in the extended MIB may enable cell acquisition via the repeater 806 without the base station 804 transmitting a SIB. The second amount of extended information bits in the extended SIB may enable cell acquisition via the repeater 806 without the base station 804 transmitting additional SIBs.

In one aspect, the extended MIB may include a higher amount of the first information bits compared to at least one other MIB or the extended SIB may include a higher amount of the second information bits compared to at least one other SIB. For example, the extended MIB illustrated in FIG. 6 may include a higher amount of information bit compared to a MIB in the SSB illustrated in FIG. 5. In another example, the extended SIB illustrated in FIG. 7 may include a higher amount of information bits compared to the SIB illustrated in FIG. 5.

In one aspect, the MIB may be a repeater-specific MIB and the SIB may be a repeater-specific SIB. For example, referring to FIG. 8, the MIB transmitted at 810 may be specific to the repeater 806. In further example, the extended MIB illustrated in FIG. 6 may be specific to the repeater 606. In another example, referring to FIG. 8, the SIB transmitted at 816 may be specific to the repeater 806. In yet another example, the extended SIB1 illustrated in FIG. 7 may be specific to the repeater 708.

In one aspect, the repeater-specific SIB may fail to include information in at least one other SIB. For example, the extended SIB1 illustrated in FIG. 7 may omit certain information that is included in the SIB1 illustrated in FIG. 5. Omission of the certain information may reduce signaling overhead.

In one aspect, the information in the at least one other SIB may include one or more of: cell selection information, a RACH configuration, common cell reselection information, a NR intra-frequency neighbor cell list and reselection criteria, E-UTRA neighbor cell list and reselection criteria, ETWS information, a GPS time, or a UTC. For example, the SIB1 illustrated in FIG. 5 may include cell selection information, a RACH configuration, common cell reselection information, a NR intra-frequency neighbor cell list and reselection criteria, E-UTRA neighbor cell list and reselection criteria, ETWS information, a GPS time, and/or a UTC.

In one aspect, the network node may operate in FR5. For example, the base station 604, the base station 710, and/or the base station 804 may operate in FR5. In one aspect, the SIB may be a SIB1. For example, referring to FIG. 8 at 816, the extended SIB transmitted by the base station 804 may be a SIB1. In another example, FIG. 7 illustrates an extended SIB1.

In one aspect, at least one of the SIB or the SSB including the MIB may be transmitted to the UE via the repeater. For example, referring to FIG. 6, the base station 604 may transmit an extended MIB to the UE 602 via the repeater 606. In a further example, referring to FIG. 7, the base station 710 may transmit the SSB that includes a MIB and an extended SIB1 to the UE 706 via the repeater 708. In another example, referring to FIG. 8 at 810, the base station 804 may transmit an extended MIB to the UE 802 via the repeater 806. In a further example, referring to FIG. 8 at 816, the base station 804 may transmit an extended SIB to the UE 802 via the repeater 806.

In one aspect, the MIB may include at least one of: cell selection information, common cell reselection information, barring information, or UE timer and constant information. For example, referring to FIG. 6, the extended MIB may include cell selection information, common cell reselection information, barring information, and/or UE timer and constant information. In another example, referring to FIG. 8 at 810, the extended MIB transmitted by the base station 804 may include cell selection information, common cell reselection information, barring information, and/or UE timer and constant information.

In one aspect, the MIB may further include at least one of: a system frame number, a subcarrier spacing, an SSB subcarrier offset, a DM-RS type A position, a PDCCH configuration for a SIB1, a cell barred status, or an intra-frequency reselection status. For example, referring to FIG. 6, the extended MIB may include a system frame number, a subcarrier spacing, an SSB subcarrier offset, a DM-RS type A position, a PDCCH configuration for a SIB1, a cell barred status, and/or an intra-frequency reselection status. In another example, referring to FIG. 8 at 810, the SSB with the extended MIB transmitted by the base station 804 may include a system frame number, a subcarrier spacing, an SSB subcarrier offset, a DM-RS type A position, a PDCCH configuration for a SIB1, a cell barred status, and/or an intra-frequency reselection status.

In one aspect, the MIB is transmitted via a PBCH. For example, referring to FIG. 8 at 810, the base station 804 may transmit the SSB with the extended MIB via a PBCH.

In one aspect, the PBCH may include at least one of a higher amount of channel bits or a higher amount of information bits compared to at least one other PBCH. For example, referring to FIG. 8, the PBCH at 810 may include a higher amount of channel bits or a higher amount of information bits compared to the PBCH at 814. In one aspect, if the PBCH includes the higher amount of the information bits, the PBCH may include a higher coding rate compared to the at least one other PBCH. For example, referring to FIG. 8, the PBCH at 810 may include a higher amount of information bits than information bits of the PBCH at 814 and the PBCH at 810 may include a higher coding rate compared to a coding rate of the PBCH at 814.

In one aspect, the SIB may be transmitted after the SSB including the MIB. For example, FIG. 7 illustrates that the base station 710 may transmit the extended SIB1 after the base station 710 transmits the SSB with a MIB. In another example, referring to FIG. 8, the base station 804 may transmit a SSB with a MIB at 814 and the base station 804 may transmit an extended SIB at 816, where 814 may occur before 816.

In one aspect, the SIB may be transmitted via a PDSCH. For example, referring to FIG. 8 at 816, the base station 804 may transmit the extended SIB via a PDSCH.

In one aspect, at 1208, the network node may receive a request for an adjusted configuration for at least one of the MIB or the SIB, where the request may be received from the UE. For example, referring to FIG. 8, the base station 804 may receive a request for an adjusted configuration transmitted by the UE 802 at 818. For example, 1208 may be performed by the cell acquisition component 199.

In one aspect, at 1202, the network node may receive an indication of a configuration for at least one of the MIB or the SIB prior to configuring at least one of the MIB or the SIB, where the indication may be received from the repeater. For example, referring to FIG. 8 at 807, the base station 804 may receive a configuration for a MIB or a SIB from the repeater 806, where 807 may occur prior to 808. For example, 1202 may be performed by the cell acquisition component 199.

Figure 13:
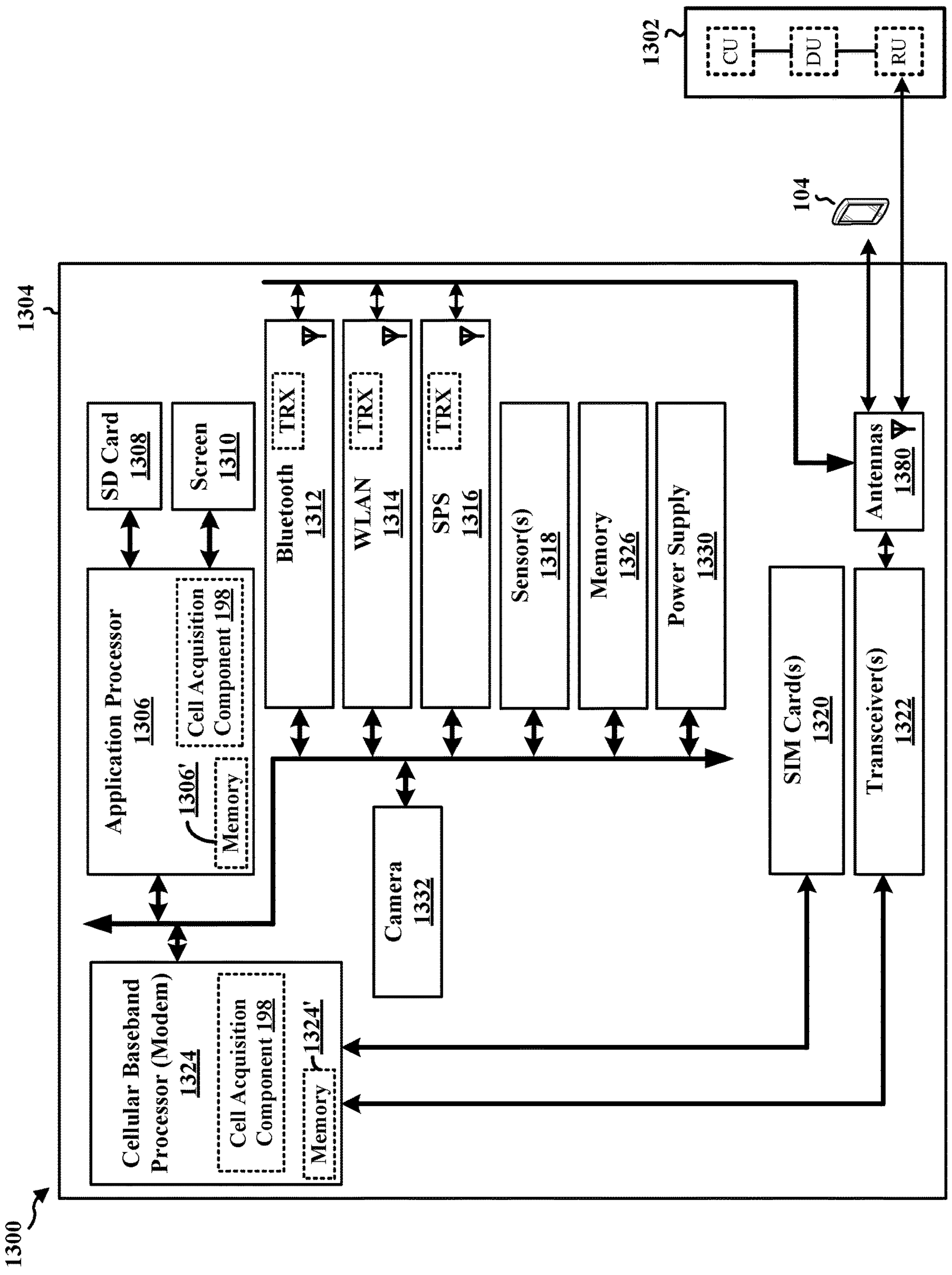
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the cell acquisition component 198 may be configured to receive at least one of a SIB or a SSB including a MIB, where at least one of the MIB or the SIB is configured for one or more of the UE or a repeater. The cell acquisition component 198 may also be configured to process at least one of the SIB or the MIB after receiving at least one of the SIB or the MIB. The cell acquisition component 198 may be within the cellular baseband processor 1324, the application processor 1306, or both the cellular baseband processor 1324 and the application processor 1306. The cell acquisition component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, may include means for receiving at least one of a SIB or a SSB including a MIB, where at least one of the MIB or the SIB is configured for one or more of the UE or a repeater. In one configuration, the apparatus 1304, and in particular the cellular baseband processor 1324 and/or the application processor 1306, may include means for processing at least one of the SIB or the MIB after receiving at least one of the SIB or the MIB. In one configuration, the apparatus 1304, and in particular the cellular baseband processor 1324 and/or the application processor 1306, may include means for transmitting a request for an adjusted configuration for at least one of the MIB or the SIB, where the request is transmitted to a network node. The means may be the cell acquisition component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
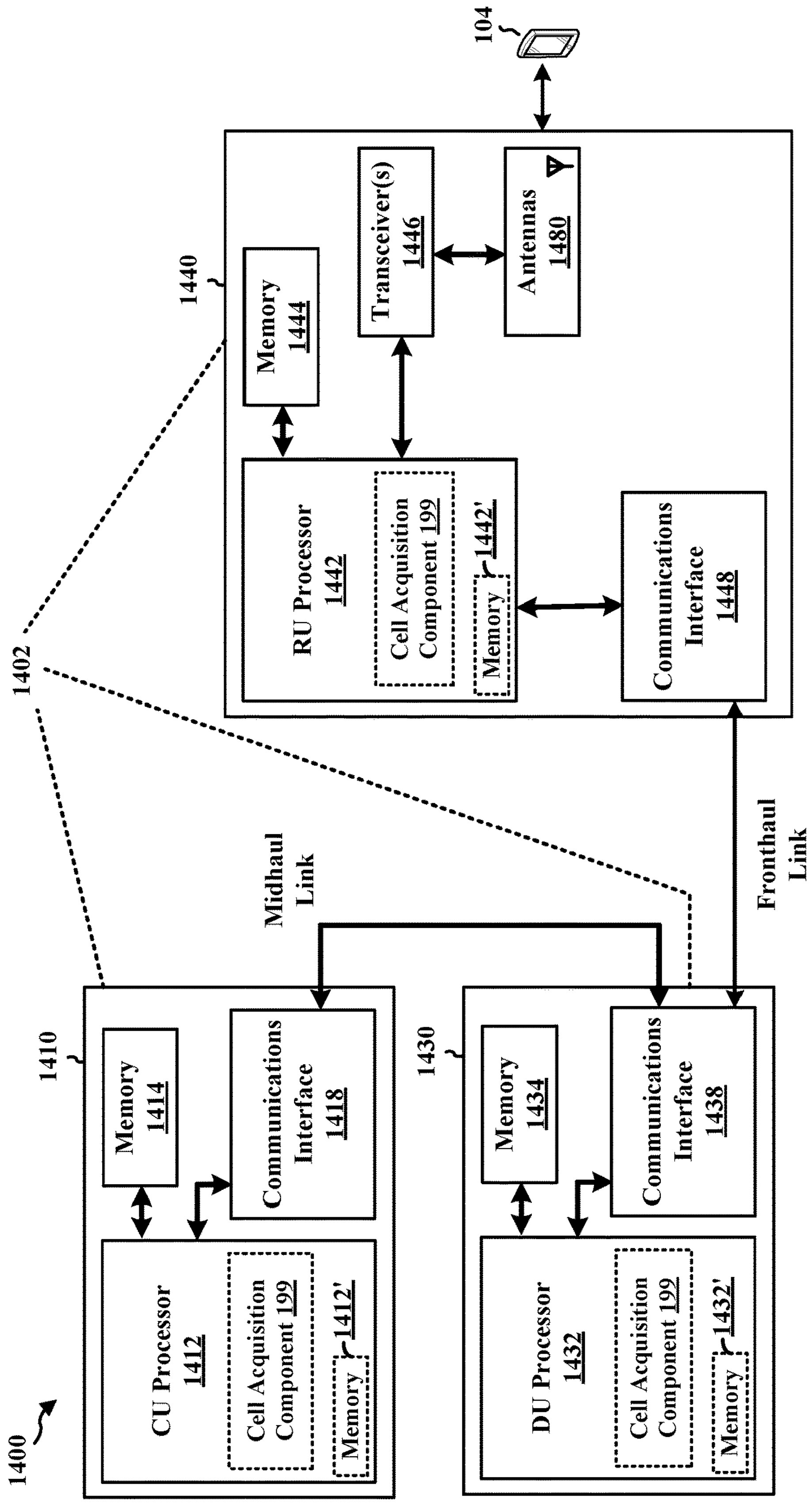
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the cell acquisition component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory.

Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the cell acquisition component 199 may be configured to configure at least one of a MIB or a SIB, where the MIB is associated with a SSB, where at least one of the MIB or the SIB is configured for one or more of a UE or a repeater. The cell acquisition component 199 may also be configured to transmit at least one of the SIB or the SSB including the MIB for one or more of the UE or the repeater. The cell acquisition component 199 may be within one or more processors of one or more of the CU 1410, DU 1430, and the RU 1440. The cell acquisition component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for configuring at least one of a MIB or a SIB, where the MIB is associated with a SSB, where at least one of the MIB or the SIB is configured for one or more of a UE or a repeater. In one configuration, the network entity 1402 includes means for transmitting at least one of the SIB or the SSB including the MIB for one or more of the UE or the repeater. In one configuration, the network entity 1402 includes means for receiving an indication of a configuration for at least one of the MIB or the SIB prior to configuring at least one of the MIB or the SIB, where the indication is received from the repeater. In one configuration, the network entity 1402 includes means for receiving a request for an adjusted configuration for at least one of the MIB or the SIB, where the request is received from the UE. The means may be the cell acquisition component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

A repeater may receive a wireless signal from a base station and amplify and/or redirect the wireless signal. In some situations, a repeater operating in a frequency band (e.g., FR1, FR2, FR5, etc.) may redirect an SSB transmitted by a base station in several directions to allow a UE to detect the SSB in a different location. The SSB may incorporate basic signaling (e.g., a PSS and a SSS) for acquisition of a cell associated with the base station. The SSB may also include data for cell connection inside a MIB carried by a PBCH. The MIB may carry information regarding where to find information utilized for cell access, cell selection management, and/or additional auxiliary information. The MIB may indicate a time and frequency location of a SIB1 and time and frequency locations of other SIBs (secondary SIBs). Transmitting SIBs to UEs in a spatial area covered by a repeater may be associated with high overhead costs. Thus, it may be beneficial to provide a MIB or a SIB that incurs less overhead with respect to cell acquisition via a repeater.

To address the aforementioned issues, an extended MIB and/or an extended SIB that may be utilized by a UE for cell acquisition via a repeater is disclosed herein. The extended MIB and/or the extended SIB may enable the UE to acquire a cell via a repeater using less signaling compared to acquiring a cell using another MIB or another SIB. In an example, a UE receives at least one of a SIB or a SSB including a MIB, where at least one of the MIB or the SIB is configured for one or more of the UE or a repeater. The UE processes at least one of the SIB or the MIB after receiving at least one of the SIB or the MIB. Processing at least one of the SIB or the MIB may enable the UE to acquire a cell associated with a network node via the repeater. In one example, the UE may acquire the cell using information from the MIB without receiving a SIB (e.g., a SIB1). In another example, the UE may acquire the cell using information from the MIB and the SIB without receiving additional SIBs. Furthermore, the aforementioned MIB and/or the SIB may reduce an amount of SIBs redirected by the repeater to the UE from a network node.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving at least one of a system information block (SIB) or a synchronization signal block (SSB) including a master information block (MIB), where at least one of the MIB or the SIB is configured for one or more of the UE or a repeater; and processing at least one of the SIB or the MIB after receiving at least one of the SIB or the MIB.

Aspect 2 is the method of aspect 1, where the MIB is an extended MIB including an extended amount of first information bits, or where the SIB is an extended SIB including an extended amount of second information bits.

Aspect 3 is the method of aspect 2, where the extended MIB includes a higher amount of the first information bits compared to at least one other MIB, or where the extended SIB includes a higher amount of the second information bits compared to at least one other SIB.

Aspect 4 is the method of any of aspects 1-3, where the MIB is a repeater-specific MIB and the SIB is a repeater-specific SIB.

Aspect 5 is the method of aspect 4, where the repeater-specific SIB fails to include first information in at least one other SIB.

Aspect 6 is the method of aspect 5, where the information in the at least one other SIB includes one or more of: cell selection information, a random access channel (RACH) configuration, common cell reselection information, a new radio (NR) intra-frequency neighbor cell list and reselection criteria, an evolved universal terrestrial radio access (E-UTRA) neighbor cell list and reselection criteria, earthquake and tsunami warning system (ETWS) information, a global positioning satellite (GPS) time, or a coordinated universal time (UTC).

Aspect 7 is the method of any of aspects 1-6, where the UE operates in frequency range 5 (FR5).

Aspect 8 is the method of any of aspects 1-7, where the SIB is a type 1 SIB (SIB1).

Aspect 9 is the method of any of aspects 1-8, where at least one of the SIB or the SSB including the MIB is received via the repeater.

Aspect 10 is the method of any of aspects 1-9, where the MIB includes at least one of: cell selection information, common cell reselection information, barring information, or UE timer and constant information.

Aspect 11 is the method of aspect 10, where the MIB further includes at least one of: a system frame number, a subcarrier spacing, an SSB subcarrier offset, a demodulation reference signal (DM-RS) type A position, a physical downlink control channel (PDCCH) configuration for a type 1 SIB (SIB1), a cell barred status, or an intra-frequency reselection status.

Aspect 12 is the method of any of aspects 1-11, where the MIB is received via a physical broadcast channel (PBCH).

Aspect 13 is the method of aspect 12, where the PBCH includes at least one of a higher amount of channel bits or a higher amount of information bits compared to at least one other PBCH.

Aspect 14 is the method of aspect 13, where if the PBCH includes the higher amount of the information bits, the PBCH includes a higher coding rate compared to the at least one other PBCH.

Aspect 15 is the method of any of aspects 1-14, where the SIB is received after the SSB including the MIB.

Aspect 16 is the method of any of aspects 1-15, where the SIB is received via a physical downlink shared channel (PDSCH).

Aspect 17 is the method of any of aspects 1-16, further including: transmitting a request for an adjusted configuration for at least one of the MIB or the SIB, where the request is transmitted to a network node.

Aspect 18 is an apparatus for wireless communication at a user equipment (UE) including a memory and at least one processor coupled to the memory and based at least in part on information stored in the memory, the at least one processor is configured to perform a method in accordance with any of aspects 1-17.

Aspect 19 is an apparatus for wireless communications, including means for performing a method in accordance with any of aspects 1-17.

Aspect 20 is the apparatus of aspect 18 or 19 further including at least one of a transceiver or an antenna coupled to the at least one processor, where at least one of the transceiver or the antenna is configured to receive at least one of the SIB or the SSB including the MIB.

Aspect 21 is a non-transitory computer-readable medium including instructions that, when executed by an apparatus, cause the apparatus to perform a method in accordance with any of aspects 1-17.

Aspect 22 is a method of wireless communication at a network node, including: configuring at least one of a master information block (MIB) or a system information block (SIB), where the MIB is associated with a synchronization signal block (SSB), where at least one of the MIB or the SIB is configured for one or more of a user equipment (UE) or a repeater; and transmitting at least one of the SIB or the SSB including the MIB for one or more of the UE or the repeater.

Aspect 23 is the method of aspect 22, where the MIB is an extended MIB including an extended amount of first information bits, or where the SIB is an extended SIB including an extended amount of second information bits.

Aspect 24 is the method of aspect 24, where the extended MIB includes a higher amount of the first information bits compared to at least one other MIB, or where the extended SIB includes a higher amount of the second information bits compared to at least one other SIB.

Aspect 25 is the method of any of aspects 22-24, where the MIB is a repeater-specific MIB and the SIB is a repeater-specific SIB.

Aspect 26 is the method of aspect 25, where the repeater-specific SIB fails to include first information in at least one other SIB.

Aspect 27 is the method of aspect 26, where the information in the at least one other SIB includes one or more of: cell selection information, a random access channel (RACH) configuration, common cell reselection information, a new radio (NR) intra-frequency neighbor cell list and reselection criteria, an evolved universal terrestrial radio access (E-UTRA) neighbor cell list and reselection criteria, earthquake and tsunami warning system (ETWS) information, a global positioning satellite (GPS) time, or a coordinated universal time (UTC).

Aspect 28 is the method of any of aspects 22-27, where the network node operates in frequency range 5 (FR5).

Aspect 29 is the method of any of aspects 22-28, where the SIB is a type 1 SIB (SIB1).

Aspect 30 is the method of any of aspects 22-29, where at least one of the SIB or the SSB including the MIB is transmitted to the UE via the repeater.

Aspect 31 is the method of any of aspects 22-30, where the MIB includes at least one of: cell selection information, common cell reselection information, barring information, or UE timer and constant information.

Aspect 32 is the method of aspect 31, where the MIB further includes at least one of: a system frame number, a subcarrier spacing, an SSB subcarrier offset, a demodulation reference signal (DM-RS) type A position, a physical downlink control channel (PDCCH) configuration for a type 1 SIB (SIB1), a cell barred status, or an intra-frequency reselection status.

Aspect 33 is the method of any of aspects 22-32, where the MIB is transmitted via a physical broadcast channel (PBCH).

Aspect 34 is the method of aspect 33, where the PBCH includes at least one of a higher amount of channel bits or a higher amount of information bits compared to at least one other PBCH.

Aspect 35 is the method of aspect 34, where if the PBCH includes the higher amount of the information bits, the PBCH includes a higher coding rate compared to the at least one other PBCH.

Aspect 36 is the method of any of aspects 22-35, where the SIB is transmitted after the SSB including the MIB.

Aspect 37 is the method of any of aspects 22-36, where the SIB is transmitted via a physical downlink shared channel (PDSCH).

Aspect 38 is the method of any of aspects 22-37, further including: receiving a request for an adjusted configuration for at least one of the MIB or the SIB, where the request is received from the UE.

Aspect 39 is the method of any of aspects 22-38, further including: receiving an indication of a configuration for at least one of the MIB or the SIB prior to configuring at least one of the MIB or the SIB, where the indication is received from the repeater.

Aspect 40 is an apparatus for wireless communication at a network node including a memory and at least one processor coupled to the memory and based at least in part on information stored in the memory, the at least one processor is configured to perform a method in accordance with any of aspects 22-39.

Aspect 41 is an apparatus for wireless communications, including means for performing a method in accordance with any of aspects 22-39.

Aspect 42 is the apparatus of aspect 40 or 41 further including at least one of a transceiver or an antenna coupled to the at least one processor, where at least one of the transceiver or the antenna is configured to transmit at least one of the SIB or the SSB including the MIB.

Aspect 43 is a non-transitory computer-readable medium including instructions that, when executed by an apparatus, cause the apparatus to perform a method in accordance with any of aspects 22-39.

What is claimed is:

1. An apparatus for wireless communication at a user equipment (UE), comprising:

memory; and at least one processor coupled to the memory and, based at least in part on information stored in the memory, the at least one processor is configured to:

receive, from a network node via a repeater, at least one of a system information block (SIB) or a synchronization signal block (SSB) including a master information block (MIB), wherein the MIB is an extended MIB including an extended amount of first information bits and is configured for one or more of the UE or the repeater and wherein the SIB is an extended SIB including an extended amount of second information bits and is configured for one or more of the UE or the repeater, wherein both of the extended amount of first information bits and the extended amount of second information bits correspond to an acquisition of a cell associated with the network node via the repeater independent of reception of a set of additional SIBs; and process at least one of the SIB or the MIB after receiving at least one of the SIB or the MIB.

2. The apparatus of claim 1, wherein the extended MIB includes a higher amount of the first information bits compared to at least one other MIB, or wherein the extended SIB includes a higher amount of the second information bits compared to at least one other SIB.

3. The apparatus of claim 1, wherein the MIB is a repeater-specific MIB and the SIB is a repeater-specific SIB.

4. The apparatus of claim 3, wherein the repeater-specific SIB fails to include first information in at least one other SIB.

5. The apparatus of claim 4, wherein the information in the at least one other SIB includes one or more of: cell selection information, a random access channel (RACH) configuration, common cell reselection information, a new radio (NR) intra-frequency neighbor cell list and reselection criteria, an evolved universal terrestrial radio access (E-UTRA) neighbor cell list and reselection criteria, earthquake and tsunami warning system (ETWS) information, a global positioning satellite (GPS) time, or a coordinated universal time (UTC).

6. The apparatus of claim 1, wherein the UE operates in frequency range 5 (FR5).

7. The apparatus of claim 1, wherein the SIB is a type 1 SIB (SIB1).

8. The apparatus of claim 1, wherein the MIB includes at least one of: cell selection information, common cell reselection information, barring information, or UE timer and constant information.

9. The apparatus of claim 8, wherein the MIB further includes at least one of: a system frame number, a subcarrier spacing, an SSB subcarrier offset, a demodulation reference signal (DM-RS) type A position, a physical downlink control channel (PDCCH) configuration for a type 1 SIB (SIB1), a cell barred status, or an intra-frequency reselection status.

10. The apparatus of claim 1, wherein to receive the MIB, the at least one processor is configured to receive the MIB via a physical broadcast channel (PBCH).

11. The apparatus of claim 10, wherein the PBCH includes at least one of a higher amount of channel bits or a higher amount of information bits compared to at least one other PBCH.

12. The apparatus of claim 11, wherein if the PBCH includes the higher amount of the information bits, the PBCH includes a higher coding rate compared to the at least one other PBCH.

13. The apparatus of claim 1, wherein to receive the SIB, the at least one processor is configured to receive the SIB after the SSB including the MIB.

14. The apparatus of claim 1, wherein to receive the SIB, the at least one processor is configured to receive the SIB via a physical downlink shared channel (PDSCH).

15. The apparatus of claim 1, wherein the at least one processor is further configured to:

transmit, to a network node, a request for an adjusted configuration for at least one of the MIB or the SIB.

16. The apparatus of claim 1, further comprising at least one of a transceiver or an antenna coupled to the at least one processor, wherein at least one of the transceiver or the antenna is configured to receive at least one of the SIB or the SSB including the MIB.

17. A method of wireless communication at a user equipment (UE), comprising:

receiving, from a network node via a repeater, at least one of a system information block (SIB) or a synchronization signal block (SSB) including a master information block (MIB), wherein the MIB is an extended MIB including an extended amount of first information bits and is configured for one or more of the UE or the repeater and wherein the SIB is an extended SIB including an extended amount of second information bits and is configured for one or more of the UE or the repeater, wherein both of the extended amount of first information bits and the extended amount of second information bits correspond to an acquisition of a cell associated with the network node via the repeater independent of reception of a set of additional SIBs; and processing at least one of the SIB or the MIB after receiving at least one of the SIB or the MIB.

18. An apparatus for wireless communication at a network node, comprising:

memory; and at least one processor coupled to the memory and, based at least in part on information stored in the memory, the at least one processor is configured to:

configure at least one of a master information block (MIB) or a system information block (SIB), wherein the MIB is associated with a synchronization signal block (SSB), wherein the MIB is an extended MIB including an extended amount of first information bits and is configured for one or more of a user equipment (UE) or a repeater and wherein the SIB is an extended SIB including an extended amount of second information bits and is configured for one or more of the UE or the repeater, wherein both of the extended amount of first information bits and the extended amount of second information bits correspond to an acquisition of a cell associated with the network node via the repeater independent of a set of additional SIBs; and transmit, via the repeater, at least one of the SIB or the SSB including the MIB for one or more of the UE or the repeater.

19. The apparatus of claim 18, wherein the extended MIB includes a higher amount of the first information bits compared to at least one other MIB, or wherein the extended SIB includes a higher amount of the second information bits compared to at least one other SIB.

20. The apparatus of claim 18, wherein the MIB is a repeater-specific MIB and the SIB is a repeater-specific SIB.

21. The apparatus of claim 20, wherein the repeater-specific SIB fails to include first information in at least one other SIB.

22. The apparatus of claim 21, wherein the information in the at least one other SIB includes one or more of: cell selection information, a random access channel (RACH) configuration, common cell reselection information, a new radio (NR) intra-frequency neighbor cell list and reselection criteria, an evolved universal terrestrial radio access (E-UTRA) neighbor cell list and reselection criteria, earthquake and tsunami warning system (ETWS) information, a global positioning satellite (GPS) time, or a coordinated universal time (UTC).

23. The apparatus of claim 18, wherein the network node operates in frequency range 5 (FR5).

24. The apparatus of claim 18, wherein the SIB is a type 1 SIB (SIB1).

25. The apparatus of claim 18, further comprising at least one of a transceiver or an antenna coupled to the at least one processor, wherein at least one of the transceiver or the antenna is configured to transmit at least one of the SIB or the SSB including the MIB.

26. A method of wireless communication at a network node, comprising:

configuring at least one of a master information block (MIB) or a system information block (SIB), wherein the MIB is associated with a synchronization signal block (SSB), wherein the MIB is an extended MIB including an extended amount of first information bits and is configured for one or more of a user equipment (UE) or a repeater and wherein the SIB is an extended SIB including an extended amount of second information bits and is configured for one or more of the UE or the repeater, wherein both of the extended amount of first information bits and the extended amount of second information bits correspond to an acquisition of a cell associated with the network node via the repeater independent of a set of additional SIBs; and transmitting, via the repeater, at least one of the SIB or the SSB including the MIB for one or more of the UE or the repeater.

* * * * *